United States Patent [19]

Faler et al.

[11] 4,455,409
[45] Jun. 19, 1984

[54] METHOD FOR MAKING BISPHENOL CATALYSTS

[75] Inventors: Gary R. Faler, Scotia; John R. Campbell, Clifton Park, both of N.Y.

[73] Assignee: General Electric Company, Schenectady, N.Y.

[21] Appl. No.: 446,135

[22] Filed: Dec. 2, 1982

[51] Int. Cl.³ .............................................. C08F 8/34
[52] U.S. Cl. ..................................... 525/351; 521/32; 525/333.5
[58] Field of Search .................. 525/328.5, 333.5, 353, 525/351

[56] References Cited

U.S. PATENT DOCUMENTS 4,294,995  10/1981  Faler et al. .
4,346,247   8/1982  Faler ................................. 568/728

OTHER PUBLICATIONS

Brewster, R. Q., Organic Chemistry, Prentice Hall (N.J.), 1948, pp. 300, 301.

Primary Examiner—C. A. Henderson
Attorney, Agent, or Firm—William A. Teoli; James C. Davis, Jr.; James Magee, Jr.

[57] ABSTRACT

A method is provided for making sulfonated aromatic organic polymers having aminoorganomercaptan groups attached to backbone sulfonyl radicals by covalent nitrogen-sulfur linkages. These sulfonated aromatic organic polymers can be used as an ion-exchange resin for making bisphenols.

7 Claims, No Drawings

METHOD FOR MAKING BISPHENOL CATALYSTS

CROSS REFERENCE TO RELATED APPLICATIONS

Reference is made to copending application Ser. No. 298,711, filed Sept. 2, 1981, now U.S. Pat. No. 4,396,728, of Gary R. Faler, for Method and Catalyst for Making Bisphenol, Ser. No. 342,435, filed Jan. 25, 1982, of Gary R. Faler et al, for Catalyst for Synthesizing Bisphenol and Method for Making Same, Ser. No. 309,351, filed Oct. 7, 1981, now abandoned, of Gary R. Faler for Method and Catalyst for Making bisphenol, where all of the aforementioned applications are assigned to the same assignee as the present invention and incorporated herein by reference.

BACKGROUND OF THE INVENTION

The present invention relates to a method for making sulfonated aromatic organic polymer having aminoorganomercaptan groups attached to backbone sulfonyl radicals by covalent nitrogen-sulfur linkages. More particularly, the present invention relates to a method of covalently bonding by nitrogen-sulfur linkages certain aminoorganothioethers to sulfonated aromatic organic polymer, and thereafter cleaving the resulting covalently bonded thioether groups to the corresponding mercaptans.

Prior to the present invention, as shown by Faler et al, U.S. Pat. Nos. 4,294,995 and 4,346,247, sulfonated polystyrene ion-exchange resins having organo mercaptan groups attached to backbone sulfonyl radicals by covalent nitrogen-sulfur linkages, were made by modifying halosulfonyl aromatic organic polymers, such as chlorosulfonyl polystyrene with aminoorganodisulfide to produce an intermediate sulfonated polystyrene resin having covalently bonded aminoorganodisulfide groups. The aforementioned ion-exchange precursor was treated with a reducing agent, such as a triorganophosphine, to convert the disulfide to an organo mercaptan.

Improved results were achieved as shown by copending application Ser. No. 342,435, Faler et al, filed Jan. 25, 1982 using the aminoorganodisulfide method which was thereafter reduced to the corresponding organo mercaptan group. Additional procedures for making ion-exchange resins are taught in foreign patent documents such as 23325, 7/1980, European Patent Office, 2,733,537, 2/1978, 2,931,036, 2/1981 Federal Republic of Germany.

The present invention is based on the discovery that aminoorganothioethers of the formula

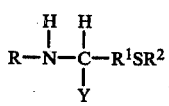

where R is selected from hydrogen and a $C_{(1-8)}$ alkyl radical, $R^1$ is a divalent $C_{(1-13)}$ organic radical, $R^2$ is a cleavable organic radical and preferably acid cleavable organic radical and Y is selected from hydrogen, carboxy and nitrile, can be reacted with a halosulfonyl aromatic organic polymer, such as chlorosulfonyl polystyrene ion-exchange resin to produce a sulfonated aromatic organic polymer having aminoorganothioether groups attached to backbone sulfonyl radicals by covalent nitrogen-sulfur linkages. The covalently bonded aminoorganothioether groups thereafter can be cleaved under acidic conditions to produce the corresponding sulfonated aromatic organic polymer having covalently bonded aminoorganomercaptan groups. The resulting ion-exchange resin can be used to effect phenol-ketone condensation in the synthesis of bisphenols.

STATEMENT OF THE INVENTION

There is provided by the present invention, a method for making sulfonated aromatic organic polymer having aminoorganomercaptan groups attached to backbone sulfonyl radicals by covalent nitrogen-sulfur linkages which comprises (A) effecting reaction in the presence of base between
  (a) a halosulfonyl aromatic organic polymer and
  (b) a thioether of formula (1), to produce sulfonated aromatic organic polymer having aminoorganothioether groups attached to backbone sulfonyl radicals by covalent nitrogen-sulfur linkages, (B) contacting the resulting sulfonated aromatic organic polymer of (A) with an effective amount of an ether cleaving catalyst to produce the corresponding covalently bonded aminoorganomercaptan groups, and (C) recovering the resulting aromatic organic polymer having covalently bonded aminoorganomercaptan groups from the mixture of (B).

As utilized in the description of the method of the present invention, the expression "sulfonated aromatic organic polymer having aminoorganomercaptan groups covalently attached to sulfonyl radicals by nitrogen-sulfur linkages," referred to hereinafter as the "sulfonated aminoorganomercaptan polymer" means a sulfonated aromatic organic polymer consisting essentially of chemically combined units having the formula,

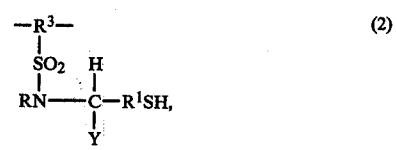

or a mixture consisting essentially of formula (2) units chemically combined with sulfonated aromatic units of the formula,

where R and $R^1$ are as previously defined, $R^3$ is a trivalent $C_{(6-13)}$ aromatic organic radical and a is 1 or 2.

The sulfonated aminoorganomercaptan polymer as defined above, also includes a blend of such polymer with a sulfonated aromatic organic polymer consisting essentially of sulfonated aromatic units of formula (3).

Preferably, the sulfonated aminoorganomercaptan polymer made in accordance with the method of the invention can contain from about 4 mole percent to about 40 mole percent of chemically combined divalent sulfonated aminoorganomercaptan units of formula (2) and correspondingly from 96 to 60 mole percent of units of formula (3).

The sulfonated aromatic organic polymer having aminoorganothioether groups can be made by effecting reaction between thioether of formula (1) and halosulfonyl organic polymer consisting essentially of halosulfonyl aromatic organic units of the formula,

where $R^3$ is as previously defined and X is a halogen radical, for example chloro. More particularly, the halosulfonyl aromatic organic polymer can consist essentially of from about 5 to about 95 mole percent of divalent aromatic organic units of formula (4) chemically combined with from about 95 mole percent to about 5 mole percent of divalent sulfonated aromatic organic units of formula (3).

Radicals included by R of formulas (1) and (2) are, for example, hydrogen, $C_{(1-8)}$ alkyl radicals, for example, methyl, ethyl, propyl, butyl, pentyl, etc.; radicals included by $R^1$ of formulas (1) and (2) are, for example, $C_{(1-13)}$ alkylene radicals, for example, methylene, ethylene, propylene, butylene, pentylene, etc.; aromatic radicals, for example, phenylene, xylylene, tolylene, naphthylene, etc.

Cleavable radicals included by $R^2$ can be substantially linear $C_{(1-8)}$ alkyl radicals, for example, methyl, ethyl, propyl, when a basic catalyst is used in the cleavage reaction, such as an amine, mercaptide thiourea, etc; while branch radicals, such as t-butyl, or benzyl have been found cleavable under acid conditions as defined hereinafter.

In addition, $R^1$ also includes substituted alkylene and arylene radicals as previously defined, such as halo-substituted, for example, chloro, fluoro, etc. Radicals included within $R^3$ are, for example,

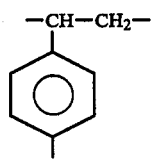

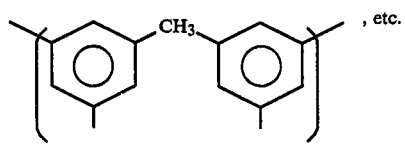

Among the sulfonated aromatic organic polymers consisting essentially of formula (3) units which can be converted to the halosulfonyl and used in accordance with the practice of the present invention with the aminoorganothioethers of formula (1), there are included, for example, Amberlite-118, manufactured by Rohm and Haas Company, Dowex 50W X4, manufactured by Dow Chemical Company, etc., and other sulfonated polystyrenes which have been cross-linked with divinylbenzene.

The halogenation of the sulfonated aromatic organic polymer consisting essentially of chemically combined formula (3) units, can be accomplished by standard procedures such as by use of chlorosulfonic acid, thionyl chloride, etc.

The formation of the aminoorganomercaptan derivative from the halosulfonyl aromatic organic polymer and the alkylaminoorganothioether can proceed in accordance with the preferred acid cleavage reaction as follows:

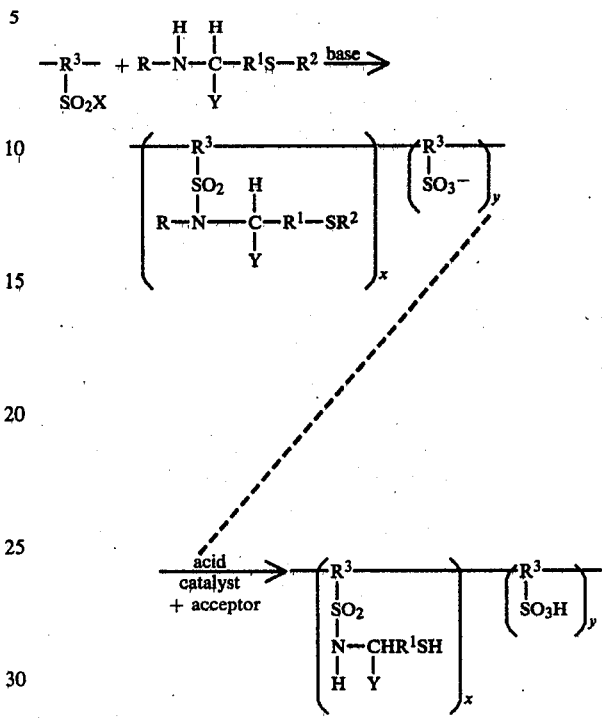

where x and y are mole percent ranges for the chemically combined units of the resulting aminoorganomercaptan polymer within values as previously defined.

Aminoorganothioethers of formula (1) which can be used in the practice of the present invention are, for example,

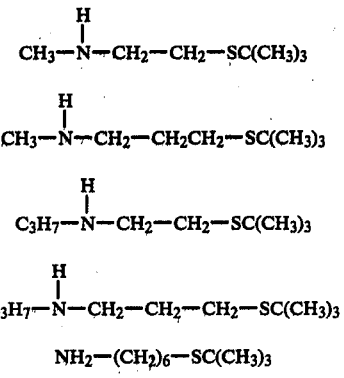

The aminoorganothioethers of formula (1) can be prepared by effecting reaction between the corresponding organomercaptan and dihaloalkane in the presence of an alkali metal alkoxide. Contact can then be effected between the resulting halothioether, with ammonia or appropriate $C_{(1-8)}$ alkyl amine in a suitable organic solvent. The resulting mixture can be refluxed in the presence of a basic aqueous alkali solution. The aminoorganothioether can be distilled from the resulting mixture.

Reaction between the aminoorganothioether and the halosulfonated aromatic organic polymer can be facilitated by utilizing the aminoorganothioether as an aqueous mixture with an inert organic solvent and base at a temperature in the range of from 5° C. to 100° C. Suitable organic solvents are, for example, tetrahydrofuran, methanol, ethanol, chlorobenzene, etc. Some of the bases which can be used are, for example, alkali metal carbonates, such as sodium carbonate, sodium bicarbonate, tertiary organic amines, for example, triethylamine, etc. The mixture can be refluxed for several hours to completely hydrolyze the residual sulfonyl halide.

The proportions of the aminoorganothioether which can be employed with the halosulfonyl aromatic organic polymer can vary widely depending upon the mole percent substitution of the chemically combined aromatic halosulfonyl units in the backbone of the aromatic organic polymer. Effective results can be achieved if sufficient aminoorganothioether is employed to provide at least 0.04 to 1.5 equivalents of nitrogen per halosulfonyl equivalent of the aromatic organic polymer.

The resulting ion-exchange derivative can then be washed and acidified to provide the aminoorganothioether sulfonyl aromatic organic polymer derivative.

Acid cleavage of the aminoorganothioether groups on the sulfonated aromatic organic polymer can be accomplished by heating the aminoorganothioether substituted sulfonated aromatic polymer with a phenolic or aromatic ether acceptor, such as phenol, cresol, anisole, diphenol ether, etc., in combination with an acidic catalyst, such as sulfonic acid, for example, methane sulfonic acid, etc. Preferably, the acidic catalyst can be unreacted sulfonic acid groups on the backbone of the sulfonated aromatic organic polymer such as shown by formula (3) units.

It is preferred to use sufficient acceptor to provide at least a stoichiometric equivalence between the acceptor and the aminoorganothioether utilized in forming the aminoorganothioether substituted sulfonated aromatic organic polymer.

Experience has shown that a cleavage of the aminoorganothioether groups on the sulfonated organic polymer is preferably effected at a temperature in the range of from 40° C. to 110° C. in a batch or continuous manner.

In order that those skilled in the art will be better able to practice the invention, the following examples are given by way of illustration and not by way of limitation. All parts are by weight.

EXAMPLE 1

There was added dropwise over a period of one hour, 389 grams of 2-methyl-2-propanethiol to a solution of 300 grams of potassium hydroxide in one liter of methanol which was maintained at a temperature of 20°-30° C. The resulting solution was then cooled and then there was added dropwise thereto 686 grams of 3-bromochloropropane over a period of 1.5 hours.

The above mixture was stirred for 18 hours and diluted with 3 liters of water. A yellow oil precipitated which was washed twice with 500 ml of water. There was added dropwise, 400 grams of the yellow oil to a refluxing solution of 430 grams of propylamine and 200 ml of methanol. The resulting solution was then refluxed for 18 hours. There was then added dropwise to the resulting solution, 200 grams of sodium hydroxide in the form of a 50% aqueous solution. The mixture was distilled resulting in the isolation of 360 grams of a colorless fraction having a boiling point of 105°-110° C./10 torr. Based on the method of preparation, there was obtained an 86% yield of N-propyl-3-aminopropane-1-t-butylthioether.

A mixture of 1000 ml of anhydrous chloroform, 2622.6 grams of Amberlite-118, a crosslinked sulfonated polystyrene polymer manufactured by the Rohm & Hass Company, and 361.1 grams of chlorosulfonic acid was refluxed with stirring under an atmosphere of nitrogen for a period of three days. The mixture was allowed to cool and the chloroform-chlorosulfonic acid solution was decanted from the remaining resin.

The resin was then washed with chloroform. The wet resin was then slowly added to a methanol solution at 5° C. at a rate sufficient to maintain the temperature below 15° C. The resulting mixture was filtered and the resin was washed with cold water, methanol, chloroform, and finally diethyl ether. After a brief air drying, the resin was dried by azeotropic distillation with heptane, followed by drying in an evacuated oven at 70° C. Based on the method of preparation, there was obtained a chlorosulfonyl polystyrene resin having about 95 mole percent of chemically combined chlorosulfonylstyryl units.

There was added with stirring, 80 grams of the above chlorosulfonyl polystyrene to a solution of 19.8 grams of the above N-propyl-3-aminopropane-1-t-butylthioether, 500 ml of tetrahydrofuran and 75 ml of water. The mixture was stirred for 15 minutes at 20° C. and 25 grams of sodium carbonate was added. The resulting mixture was then gently agitated under a nitrogen atmosphere for 12-18 hours. An aqueous solution of 15 grams of sodium carbonate and 200 ml of water was then added and the resulting mixture was refluxed for 4 hours. A product was obtained by filtering the mixture, washing the solid with 2 liters of water, 2 liters of a dilute 15% sulfuric acid solution, followed by additional water until the washings were neutral. The product was then further washed with methanol and diethyl ether. The product was then dried by azeotropic distillation with toluene followed by further drying in an evacuated oven at 70° C. Based on the method of preparation the product was a sulfonated polystyrene having about 26 mole percent of N-(propyl)-N-(3-propyl-t-butylthioether)sulfonamido groups attached to the sulfonyl radicals by nitrogen-sulfur linkages.

There was added a mixture of 453 grams of phenol and 5 grams of methanesulfonic acid to 85 grams of the above sulfonated polystyrene containing N-(propyl)-N-(3-propyl-t-butylthioether)sulfonamido groups. The resulting mixture was heated and stirred at 70°-80° C. for 12-18 hours. The mixture was allowed to cool, diluted with methanol and filtered. The resulting product was then washed successively with water, dilute sulfuric acid, methanol, diethyl ether and dried by azeotropic distillation with toluene, followed by drying in an evacuated oven at 70° C. Based on the method of preparation and nitrogen analysis in accordance with the known microanalytical combustion method, there was obtained a sulfonated polystyrene ion-exchange resin having 26 mole percent of N-propyl-N-(3-propylmercapto)sulfonamido groups attached to sulfonyl radicals by nitrogen-sulfur linkages.

A mixture of 1 gram of the above sulfonated polystyrene ion-exchange resin having N-propyl-N-(3-propylmercapto)sulfonamido groups, 5 grams of phenol and 0.5 gram of acetone was heated with stirring at 70° C. for 1 hour. The mixture was allowed to cool and was diluted with acetonitrile followed by filtration and washing of the catalyst with acetonitrile. The concentration of the filtrate provided a pale-yellow liquid which crystallized on standing. There was obtained a mixture of 96% by weight of para-para-bisphenol-A and about 4% of ortho-para-bisphenol-A as a result of an acetone conversion of about 50%, based on high pressure liquid chromatography.

The above procedure was repeated, except that there was utilized 26.0 grams of the N-propyl-3-aminopropane-1-t-butylthioether to provide an ion-exchange resin having about 34 mole percent of the N-propyl-N-(3-propylmercapto)sulfonamido groups. There was obtained a 50% acetone conversion.

EXAMPLE 2

There was added with stirring, 80 grams of the chlorosulfonyl polystyrene of Example 1, to a solution of 24.8 grams of the N-propyl-3-aminopropane-1-t-butylthioether, 500 ml of tetrahydrofuran and 50 ml of water. After stirring the resulting mixture for 20 minutes, there was added 60 grams of triethylamine at 15°–20° C. The mixture was then stirred gently for 12–18 hours. There was then added 25 grams of sodium carbonate, 200 ml of water and the resulting mixture was refluxed for 3 hours.

The above sulfonated polystyrene resin having N-propyl-N-(3-propyl-t-butylthioether)sulfonamido groups was then treated with anhydrous phenol to effect cleavage of the thioether groups following the procedure of Example 1. Based on method of preparation and nitrogen analysis, the resulting sulfonated polystyrene ion-exchange resin having N-propyl-N-(3-propylmercapto)sulfonamido groups was found to have about 19 mole percent of chemically combined sulfonated styryl units with aminoorganomercapton groups attached to sulfonyl radicals by nitrogen-sulfur linkages. There was obtained a 45% acetone conversion when this ion-exchange resin was used in accordance with the procedure of Example 1 with phenol and acetone.

When the above procedure was repeated with an ion-exchange resin having about 13 mole percent of chemically combined sulfonated styryl units with aminoorganomercapton groups attached, there was obtained a 37% acetone conversion.

EXAMPLE 3

Anhydrous phenol was pumped through a reactor maintained at 70° C. at a rate of 1.5 grams per minute for 3 hours. The reactor consisted of a jacketed 1.0 inch (ID) times 12 inch glass column which plugged at one end with glass wool. The reactor contained 26 grams of the sulfonated polystyrene resin of Example 1 having N-propyl-N-(3-propyl-t-butylthioether)sulfonamido groups attached to the sulfonyl radicals of the sulfonated polystyrene by nitrogen-sulfur linkages.

There was then fed into the above reactor, an anhydrous mixture having an 8:1 molar ratio of phenol to acetone at a flow rate of 1.5 grams per minute. Analysis of the resulting product stream from the reactor by high pressure liquid chromatography showed that a 70% conversion of acetone to bisphenol-A isomers was obtained.

Although the above examples are directed to only a few of the very many variables present in the practice of the method of the present invention, it should be understood that the present invention is directed to the use of a much broader variety of sulfonated aromatic organic polymers, aminoorganothioethers of formula (1) and acidic catalysts to make sulfonated aromatic organic polymers having chemically combined aminoorganomercaptan groups attached to sulfonyl radicals by nitrogen-sulfur linkages.

What we claim as new and desire to secure by Letters Patent of the United States is:

1. A method for making sulfonated aromatic organic polymer having aminoorganomercaptan groups attached to backbone sulfonyl radicals by covalent nitrogen-sulfur linkages which comprises
   (A) effecting reaction in the presence of base between
      (a) a halosulfonyl aromatic organic polymer and
      (b) a thioether of the formula

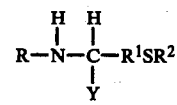

to produce sulfonated aromatic organic polymer having aminoorganothioether groups attached to backbone sulfonyl radicals by covalent nitrogen-sulfur linkages,
   (B) contacting the resulting sulfonated aromatic organic polymer of (A) with an effective amount of a phenolic acceptor and a sulfonic acid containing ether cleaving catalyst to produce the corresponding covalently bonded aminoorganomercaptan groups, and
   (C) recovering the resulting aromatic organic polymer having covalently bonded aminoorganomercaptan groups from the mixture of (B), where R is selected from hydrogen and a $C_{(1-8)}$ alkyl radical, $R^1$ is a divalent $C_{(1-13)}$ organic radical, $R^2$ is a cleavable organic radical and Y is selected from hydrogen, carboxy and nitrile.

2. A method in accordance with claim 1, where the aminoorganothioether is N-propyl-3-aminopropane-1-t-butylthioether.

3. A method in accordance with claim 1, where the sulfonated aromatic organic polymer is sulfonated polystyrene.

4. A method in accordance with claim 1, where the phenolic acceptor is phenol.

5. A method in accordance with claim 1, where the ether cleaving acidic catalyst is methane sulfonic acid.

6. A method in accordance with claim 1, where the sulfonated aromatic organic polymer has 4 to 40 mole percent of chemically combined aminoorganomercaptan aromatic units.

7. A method in accordance with claim 1, where the sulfonated aromatic organic polymer is sulfonated polystyrene.

* * * * *